US012217671B2

(12) United States Patent
Dou

(10) Patent No.: US 12,217,671 B2
(45) Date of Patent: Feb. 4, 2025

(54) PIXEL DRIVING CIRCUIT, DRIVING METHOD THEREOF, AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Wei Dou, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/756,647

(22) PCT Filed: Apr. 22, 2022

(86) PCT No.: PCT/CN2022/088415
§ 371 (c)(1),
(2) Date: May 29, 2022

(87) PCT Pub. No.: WO2023/197355
PCT Pub. Date: Oct. 19, 2023

(65) Prior Publication Data

US 2024/0161689 A1 May 16, 2024

(30) Foreign Application Priority Data

Apr. 11, 2022 (CN) ......................... 202210371789.6

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2310/0248;
(Continued)

(56) References Cited

U.S. PATENT DOCUMENTS

2002/0060321 A1* 5/2002 Kazlas .................... H01L 28/60
257/E27.113
2003/0052618 A1* 3/2003 Ishizuka ............ H10K 59/1213
315/161
(Continued)

FOREIGN PATENT DOCUMENTS

CN 107507567 A 12/2017
CN 107731166 A 2/2018
(Continued)

OTHER PUBLICATIONS

International Search Report in International application No. PCT/CN2022/088415,mailed on Dec. 29, 2022.
(Continued)

*Primary Examiner* — Jeff Piziali
(74) *Attorney, Agent, or Firm* — PV IP PC; Wei Te Chung

(57) ABSTRACT

The present disclosure provides a pixel driving circuit, a driving method thereof, and a display panel. A switching transistor and a sensing transistor are controlled with the same scanning line. In a detection stage, a voltage of a scanning signal line is adjusted to enable the sensing transistor to be turned on and the switching transistor to be turned off, so that a gate and a source of the driving transistor are in a floating state. A storage capacitor maintains a gate-source potential difference of the driving transistor to be stable, thereby it can accurately compensate for the mobility of the driving transistor.

6 Claims, 7 Drawing Sheets

(52) U.S. Cl.
CPC ............... *G09G 2310/0248* (2013.01); *G09G 2310/0294* (2013.01); *G09G 2310/08* (2013.01); *G09G 2320/045* (2013.01)

(58) Field of Classification Search
CPC ....... G09G 2310/0294; G09G 2310/08; G09G 2320/045
See application file for complete search history.

(56) References Cited

U.S. PATENT DOCUMENTS

| | | | | |
|---|---|---|---|---|
| 2007/0115244 | A1* | 5/2007 | Shin | G09G 3/3266 345/100 |
| 2007/0279360 | A1* | 12/2007 | Park | G09G 3/3696 345/94 |
| 2013/0127692 | A1* | 5/2013 | Yoon | G09G 3/3258 345/80 |
| 2013/0147694 | A1* | 6/2013 | Kim | G09G 3/3233 345/82 |
| 2015/0130785 | A1* | 5/2015 | Shin | G09G 5/18 345/82 |
| 2015/0138179 | A1* | 5/2015 | Park | G09G 3/3291 345/212 |
| 2015/0154908 | A1* | 6/2015 | Nam | G09G 3/3233 345/76 |
| 2018/0061296 | A1* | 3/2018 | Shim | G09G 3/3233 |
| 2018/0182283 | A1* | 6/2018 | Lim | H10K 59/35 |
| 2019/0371237 | A1* | 12/2019 | Qian | G09G 3/3266 |
| 2020/0152135 | A1* | 5/2020 | Kang | G09G 3/3291 |
| 2020/0273428 | A1* | 8/2020 | Kim | G09G 5/10 |
| 2021/0142714 | A1* | 5/2021 | Sung | G09G 3/3266 |
| 2021/0201816 | A1* | 7/2021 | Kim | G09G 3/3266 |
| 2021/0202679 | A1* | 7/2021 | Li | H10K 59/1216 |
| 2021/0280136 | A1* | 9/2021 | Shin | G09G 3/3266 |
| 2021/0366388 | A1* | 11/2021 | Song | G09G 3/3233 |
| 2022/0157215 | A1* | 5/2022 | Park | G09G 3/3266 |
| 2022/0199041 | A1* | 6/2022 | Park | G09G 3/3275 |
| 2022/0208105 | A1* | 6/2022 | Lee | G09G 3/3266 |
| 2023/0008896 | A1* | 1/2023 | Noh | G11C 19/28 |
| 2023/0197000 | A1* | 6/2023 | Jo | G09G 3/2096 345/690 |
| 2023/0215387 | A1* | 7/2023 | Hong | G09G 3/3266 345/204 |
| 2023/0368732 | A1* | 11/2023 | Lee | G09G 3/2007 |
| 2024/0135873 | A1* | 4/2024 | Sun | G09G 3/3233 |
| 2024/0144873 | A1* | 5/2024 | Huang | G09G 3/3233 |

FOREIGN PATENT DOCUMENTS

| | | | |
|---|---|---|---|
| CN | 108877611 | A | 11/2018 |
| CN | 109584805 | A | 4/2019 |
| CN | 110718189 | A | 1/2020 |
| CN | 111063302 | A | 4/2020 |
| CN | 111445852 | A | 7/2020 |
| CN | 112071265 | A | 12/2020 |
| CN | 114038422 | A | 2/2022 |
| CN | 114203080 | A | 3/2022 |
| JP | 2007148128 | A | 6/2007 |

OTHER PUBLICATIONS

Written Opinion of the International Search Authority in International application No. PCT/CN2022/088415, mailed on Dec. 29, 2022.

Chinese Office Action issued in corresponding Chinese Patent Application No. 202210371789.6 dated Dec. 2, 2022, pp. 1-9.

* cited by examiner

PIXEL DRIVING CIRCUIT, DRIVING METHOD THEREOF, AND DISPLAY PANEL

TECHNICAL FIELD

The present disclosure relates to a display technology field, and more particularly to a pixel circuit, a driving method thereof, and a display panel.

BACKGROUND

Currently, a pixel driving circuit of an AMOLED display panel may use a 2T1C or 3T1C driving architecture. The 2T1C driving architecture includes one driving transistor, one switching transistor, and one storage capacitor. In the 2T1C driving architecture, since an initial state of a source of the driving transistor is a floating state, an initial potential of the source of the driving transistor is unstable, and a threshold voltage of the driving transistor cannot be detected in real time. This may cause a gate-source potential difference Vgs of the driving transistor to be unstable, so that light emitting brightness of the organic light emitting diode is unstable, and flicker occurs on the AMOLED display panel. The 3T1C driving architecture refers to a driving architecture obtained by adding one sensing transistor to the 2T1C driving architecture. The sensing transistor is connected to a source of the driving transistor, so that the initial potential of the source of the driving transistor can be stabilized. The threshold voltage and a mobility can be detected, through which the threshold voltage and the mobility can be compensated. However, compared with the 2T1C driving architecture, the 3T1C driving architecture needs to add a scanning line to control the sensing transistor. Therefore, a series of negative effects such as a decreased aperture ratio of the display panel, an increased frame of the display panel, and a need of adding a control timing related to the scanning line may occur.

Technical Problems

In view of this, a new pixel driving circuit needs to be provided, so as to solve problems in the prior art that may occur when the switching transistor and the sensing transistor are respectively controlled with two scanning lines in the 3T1C pixel driving circuit, such as a decreased aperture ratio of the display panel, an increased frame of the display panel, and a need of adding a control timing related to the scanning line.

Technical Solutions to the Problems

To resolve the foregoing problem, embodiments of the present disclosure provide a pixel driving circuit, a driving method thereof, and a display panel, so that the gate-source potential difference of the driving transistor can be kept stable in a detection stage, and a source-drain current flowing through the driving transistor can also be kept stable. Therefore, the mobility of the driving transistor is accurately detected, thereby accurately compensating for the mobility.

In a first aspect, an embodiment of the present disclosure provides a pixel driving circuit, including a scanning line, a data line, a sensing line, a reset line, a driving transistor, a switching transistor, a sensing transistor, a storage capacitor, and a reset switch, wherein a gate of the driving transistor is respectively connected to a drain of the switching transistor and a first terminal of the storage capacitor, a drain of the driving transistor is connected to an input terminal of a power supply, a source of the driving transistor is respectively connected to a drain of the sensing transistor and a second terminal of the storage capacitor, both a gate of the switching transistor and a gate of the sensing transistor are connected to the scanning line, a source of the switching transistor is connected to the data line, a source of the sensing transistor is connected to the sensing line, a first terminal of the reset switch is connected to the source of the sensing transistor, and a second terminal of the reset switch is connected to the reset line;

- in a pre-charging stage, the reset switch is closed, and a first scanning voltage provided to the scanning line, a data voltage provided to the data line, and a reset voltage provided to the reset line enable both the switching transistor and the sensing transistor to be turned on; and
- in a detection stage following the pre-charging stage, the reset switch is opened, a second scanning voltage provided to the scanning line enables the switching transistor to be turned off and the sensing transistor to be turned on, so that both the gate and the source of the driving transistor are in a floating state.

In some embodiments, the pixel driving circuit further includes a sampling switch and a processing unit, wherein a first terminal of the sampling switch is connected to the sensing line, and a second terminal of the sampling switch is connected to the processing unit.

In some embodiments, in the detection stage, the driving transistor is turned on and the sampling switch is turned off.

In some embodiments, in the sampling stage following the detection stage, the sampling switch is closed, the reset switch is opened, the switching transistor remains to be turned off, and both the driving transistor and the sensing transistor remains to be turned on.

In some embodiments, in the pre-charging stage, a low level is provided at the input terminal of the power supply; in the detection stage and the sampling stage, a high level is provided at the input terminal of the power supply.

In some embodiments, in the case that the switching transistor is an N-type thin film transistor, the second scanning voltage is less than the first scanning voltage.

In some embodiments, in the case that the switching transistor is a P-type thin film transistor, the second scanning voltage is greater than the first scanning voltage.

In a second aspect, an embodiment of the present disclosure further provides a driving method of a pixel driving circuit applied to the pixel driving circuit as described above, wherein the driving method includes:

- in a pre-charging stage, closing the reset switch so that a first scanning voltage provided to a scanning line, a data voltage provided to a data line, and a reset voltage provided to a reset line enable both a switching transistor and a sensing transistor to be turned on; and
- in a detection stage following the pre-charging stage, opening the reset switch so that a second scanning voltage provided to the scanning line enables the switching transistor to be turned off and the sensing transistor to be turned on, and both the gate and the source of the driving transistor being in a floating state.

In some embodiments, the driving method further include: in the sampling stage following the detection stage, closing the sampling switch, maintaining the reset switch to be opened, maintaining the switching transistor to be turned off, maintaining both the driving transistor and the sensing transistor to be turned on, obtaining a threshold voltage of the driving transistor by a sensing line, and obtaining a mobility of the driving transistor according to a current flowing through the driving transistor.

In some embodiments, the driving method further includes: in the pre-charging stage, superimposing the threshold voltage of the driving transistor obtained in the sampling stage onto a data voltage provided to the data line, and then inputting the superimposed voltage into the gate of the driving transistor.

In some embodiments, in the case that the switching transistor is an N-type thin film transistor, the first scanning voltage provided to the scanning line is decreased to the second scanning voltage at the detection stage.

In some embodiments, in the case that the switching transistor is a P-type thin film transistor, the first scanning voltage provided to the scanning line is increased to the second scanning voltage at the detection stage.

In a third aspect, an embodiment of the present disclosure further provides a display panel, wherein the display panel includes an organic light emitting diode and the pixel driving circuit as described above, wherein an anode of the organic light emitting diode is connected to a source of a driving transistor, and a cathode of the organic light emitting diode is connected to a negative terminal of a power supply; and the pixel driving circuit includes a scanning line, a data line, a sensing line, a reset line, a driving transistor, a switching transistor, a sensing transistor, a storage capacitor, and a reset switch, wherein a gate of the driving transistor is respectively connected to a drain of the switching transistor and a first terminal of the storage capacitor, a drain of the driving transistor is connected to an input terminal of a power supply, a source of the driving transistor is respectively connected to a drain of the sensing transistor and a second terminal of the storage capacitor, both a gate of the switching transistor and a gate of the sensing transistor are connected to the scanning line, a source of the switching transistor is connected to the data line, a source of the sensing transistor is connected to the sensing line, a first terminal of the reset switch is connected to the source of the sensing transistor, and a second terminal of the reset switch is connected to the reset line;

in a pre-charging stage, the reset switch is closed, and a first scanning voltage provided to the scanning line, a data voltage provided to the data line, and a reset voltage provided to the reset line enable both the switching transistor and the sensing transistor to be turned on; and in a detection stage following the pre-charging stage, the reset switch is opened, a second scanning voltage provided to the scanning line enables the switching transistor to be turned off and the sensing transistor to be turned on, so that both the gate and the source of the driving transistor are in a floating state.

In some embodiments, the pixel driving circuit further includes a sampling switch and a processing unit, wherein a first terminal of the sampling switch is connected to the sensing line, and a second terminal of the sampling switch is connected to the processing unit.

In some embodiments, in the detection stage, the driving transistor is turned on and the sampling switch is turned off.

In some embodiments, in the sampling stage following the detection stage, the sampling switch is closed, the reset switch is opened, the switching transistor remains to be turned off, and both the driving transistor and the sensing transistor remains to be turned on.

In some embodiments, in the pre-charging stage, a low level is provided at the input terminal of the power supply; in the detection stage and the sampling stage, a high level is provided at the input terminal of the power supply.

In some embodiments, in the case that the switching transistor is an N-type thin film transistor, the second scanning voltage is less than the first scanning voltage.

In some embodiments, in the case that the switching transistor is a P-type thin film transistor, the second scanning voltage is greater than the first scanning voltage.

Beneficial Effects

According to the pixel driving circuit, the driving method thereof, and the display panel provided in the embodiments of the present disclosure, the switching transistor and the sensing transistor are controlled by the same scanning line. In the pre-charging stage, the reset switch is closed, and the first scanning voltage provided to the scanning line, the data voltage provided to the data line, and the reset voltage provided to the reset line enable both the switching transistor and the sensing transistor to be turned on, so that the driving transistor is turned on. In the detection stage, the reset switch is opened to change the first scanning voltage provided to the scanning signal line to the second scanning voltage, so as to enable the sensing transistor to be turned on and the switching transistor to be turned off, so that both the gate and the source of the driving transistor are in the floating state. As a result, when the source potential of the driving transistor rises at the input terminal of the power supply, the gate potential of the driving transistor rises due to a coupling effect of the storage capacitor, and the gate-source potential difference of the driving transistor remains to be stable, so that the source-drain current flowing through the driving transistor can also remain to be stable. In this way, the mobility of the driving transistor can be accurately detected, and therefore the mobility of the driving transistor can be compensated accurately.

That is, other than controlling the switching transistor and the sensing transistor with the same scanning line in the embodiments of the present disclosure, a scanning voltage provided to the scanning line can be further adjusted in the detection stage, thereby realizing the timing effect that, in the prior art, the switching transistor and the sensing transistor are controlled by the two scanning lines respectively in the prior art and an accurate measure of the mobility of the driving transistor.

EMBODIMENTS OF THE PRESENT DISCLOSURE

To make the objectives, technical solutions, and effects of the present disclosure more clear and definite, the present disclosure is illustrated in detail below by referring to the accompanying drawings and illustrating the embodiments. It should be understood that the specific implementations described here are only used to explain the present disclosure, and are not used to limit the present disclosure.

Figure 1:
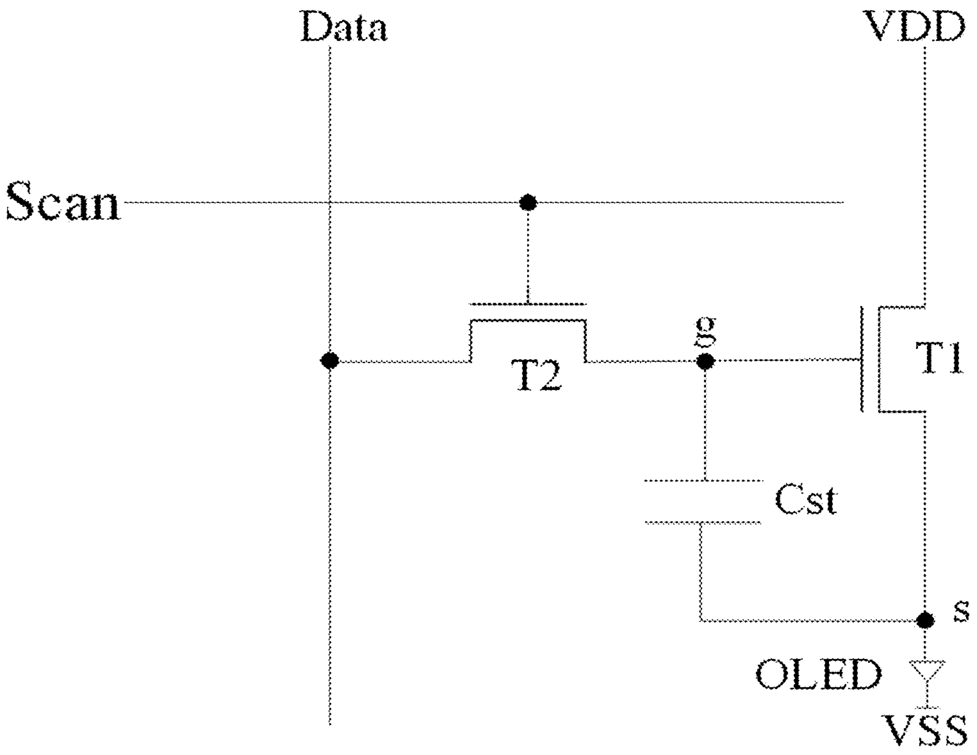
FIG. 1 (Prior Art)
FIG. 1 is a circuit diagram of a 2T1C pixel driving circuit in the prior art.

The pixel driving circuit of the AMOLED display panel may use a 2T1C driving structure. As shown in FIG. 1, the 2T1C driving structure refers to a pixel driving structure including one driving transistor T1, one switching transistor T2, and one storage capacitor Cst. The switching transistor T2 is respectively connected to a gate g of the driving transistor T1 and a data line Data. A data voltage Vdata is written into the gate g of the driving transistor T1, and the written data voltage Vdata is stored by the storage capacitor Cst. Therefore, when the organic light emitting diode OLED emits light, the driving transistor T1 is kept on. However, in the 2T1C structure, since the potential of the source s of the driving transistor T1 is not reset when an initial state of the source s of the driving transistor T1 is a floating state, the initial potential of the source s of the driving transistor T cannot be determined, which causes a potential difference across two terminals of the storage capacitor Cst, that is, a gate-source potential difference Vgs of the driving transistor Cst to be unstable after the data voltage Vdata is written. In addition, the 2T1C driving structure cannot detect a threshold voltage of the driving transistor T1 in real time, and therefore cannot compensate for the threshold voltage of the driving transistor T1. If the threshold voltage of the driving transistor T1 drifts, the gate-source potential difference Vgs of the driving transistor T1 is also unstable. Furthermore, a current flowing through the organic light emitting diode OLED, that is, the light emitting brightness of the organic light emitting diode OLED is related to the gate-source potential difference Vgs of the driving transistor T1. Therefore, the light emitting brightness of the organic light emitting diode OLED is unstable, flicker occurs on the AMOLED display panel, and further, the mobility of the driving transistor T1 cannot be accurately detected.

Figure 2:
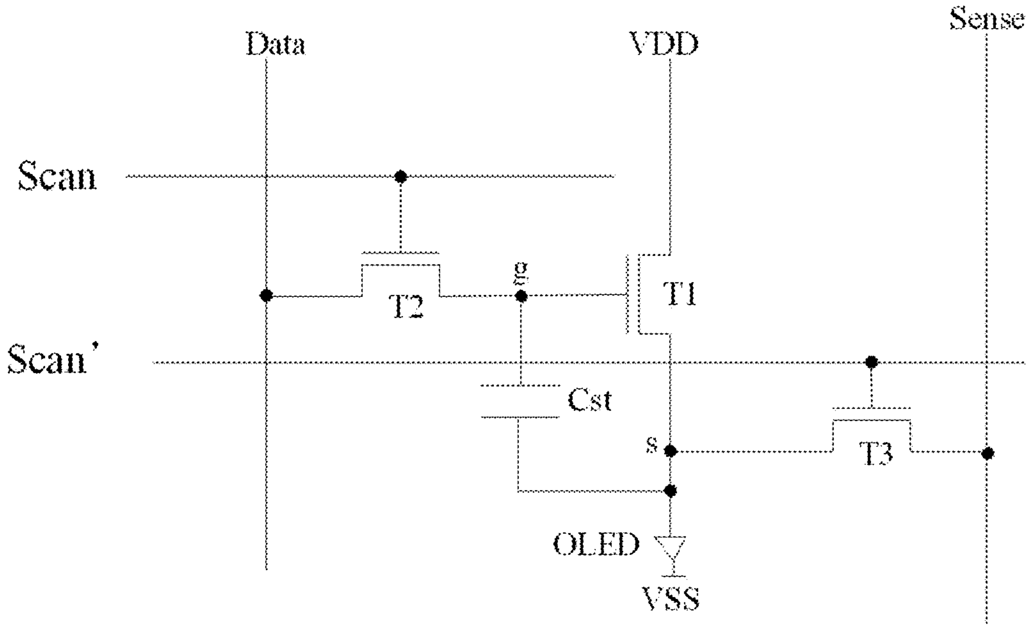
FIG. 2 (Prior Art)
FIG. 2 is a circuit diagram of a 3T1C pixel driving circuit in the prior art.
Figure 3:
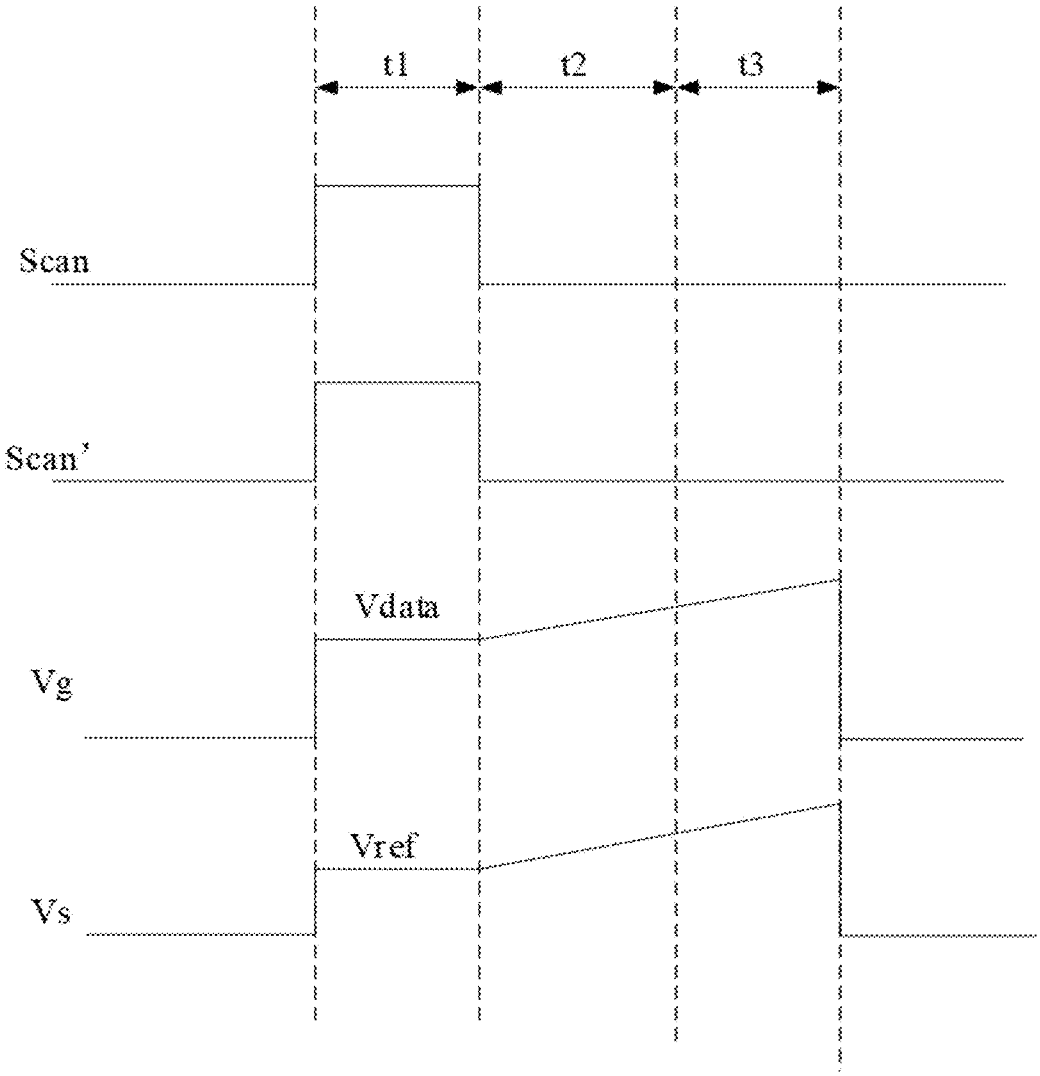
FIG. 3 (Prior Art)
FIG. 3 is a timing diagram of a 3T1C pixel driving circuit in the prior art.

Therefore, there is another driving structure, a 3T1C driving structure. As shown in FIG. 2, the 3T1C driving structure refers to a driving structure obtained by adding one sensing transistor T3 and one sensing line Sense into the 2T1C structure. The sensing transistor T3 is connected to the source s of the driving transistor T1, and is configured to reset the initial potential of the source s of the driving transistor T1 and detect the threshold voltage of the driving transistor T1 in real time, so that the initial potential of the source s of the driving transistor T1 can be kept stable. After the threshold voltage of the driving transistor T1 is detected, the threshold voltage of the driving transistor T1 can be compensated, so that the light emitting brightness of the organic light emitting diode OLED is not affected by the threshold voltage of the driving transistor T1 and remains to be stable. However, since one sensing transistor T3 is added to the 3T1C driving structure, one scanning line Scan' for controlling the sensing transistor T3 to be turned on or off needs to be added other than the original one scanning line Scan. The driving transistor T2 is turned off and the sensing transistor T3 is turned on when the threshold voltage of the driving transistor T1 is detected, so that the gate g of the driving transistor T1 is in the floating state. The potential of the source s of the driving transistor T1 is pulled up by the input terminal VDD of the power supply when the driving transistor T1 is turned on, and a potential difference across two terminals of the storage capacitor Cst can be kept stable due to a coupling effect of the storage capacitor Cst, so that the potential of the gate g of the driving transistor T1 can be changed with a change of the potential of the s, that is, a timing diagram as shown in FIG. 3. In this way, the gate-source potential difference Vgs of the driving transistor T1 can be kept stable, so that the light emitting brightness of the organic light emitting diode OLED can be stable and the mobility of the driving transistor T1 is accurately detected. However, since one scanning line Scan' is added, a series of negative effects such as a decreased aperture ratio of the display panel, an increased frame of the display panel, and a need of adding a control timing related to the scanning line may occur.

Figure 4:
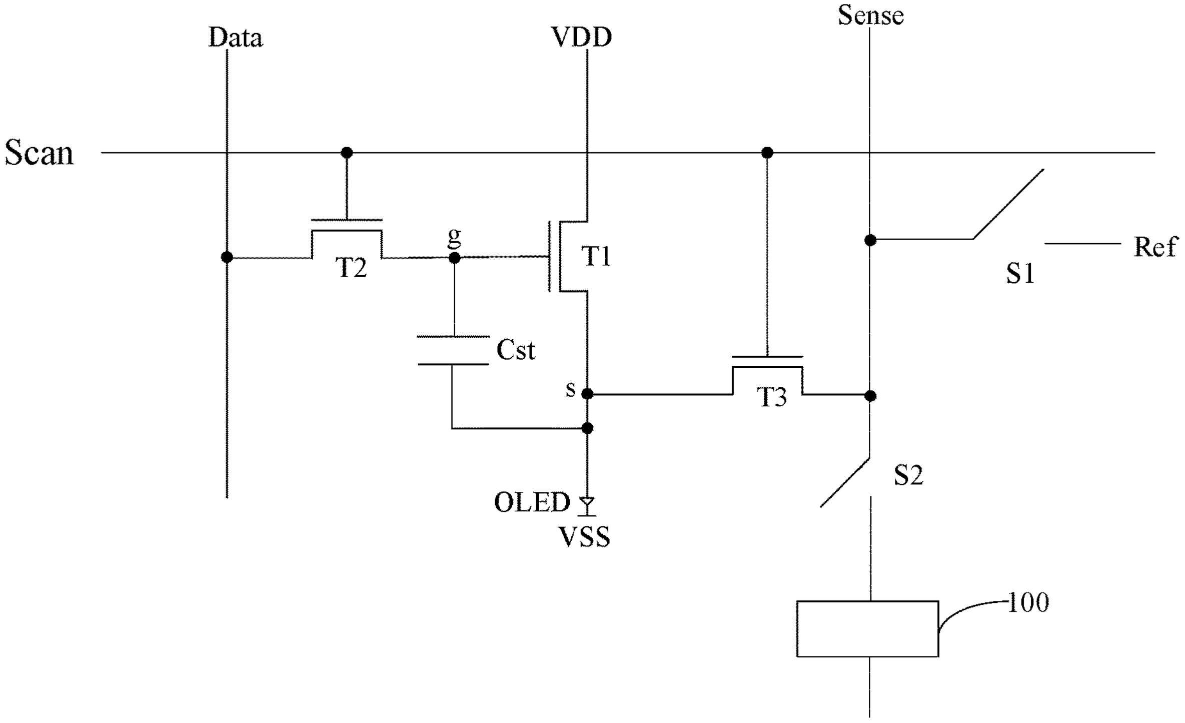
FIG. 4 is a current diagram of a pixel driving circuit according to an embodiment of the present disclosure.

In view of this, an embodiment of the present disclosure provides a new pixel driving circuit based on the 3T1C driving structure. As shown in FIG. 4, the pixel driving circuit includes a scanning line Scan, a data line Data, a sensing line Sense, a reset line Ref, a driving transistor T1, a switching transistor T2, a sensing transistor T3, a storage capacitor Cst, and a reset switch S1, where a gate g of the driving transistor T1 is respectively connected to a drain of the switching transistor T2 and a first terminal of the storage capacitor Cst, a drain of the driving transistor T1 is connected to an input terminal VDD of the power supply, a source s of the driving transistor T1 is respectively connected to a drain of the sensing transistor T3 and a second terminal of the storage capacitor Cst, both a gate of the switching transistor T2 and a gate of the sensing transistor T3 are connected to the scanning line Scan, a source of the switching transistor T2 is connected to the data line Data, a source of the sensing transistor T3 is connected to the sensing line Sense, a first terminal of the reset switch S1 is connected to the source of the sensing transistor T3, and a second terminal of the reset switch S1 is connected to the reset line Ref. That is, the pixel driving circuit controls the switching transistor T2 and the sensing transistor T3 with the same scanning line Scan, so as to avoid a series of negative effects such as a decreased aperture ratio of the display panel, an increased frame of the display panel, and an addition need of adding a control timing related to another scanning line Scan' due to new addition of the scanning line Scan' as shown in FIG. 2.

Figure 5:
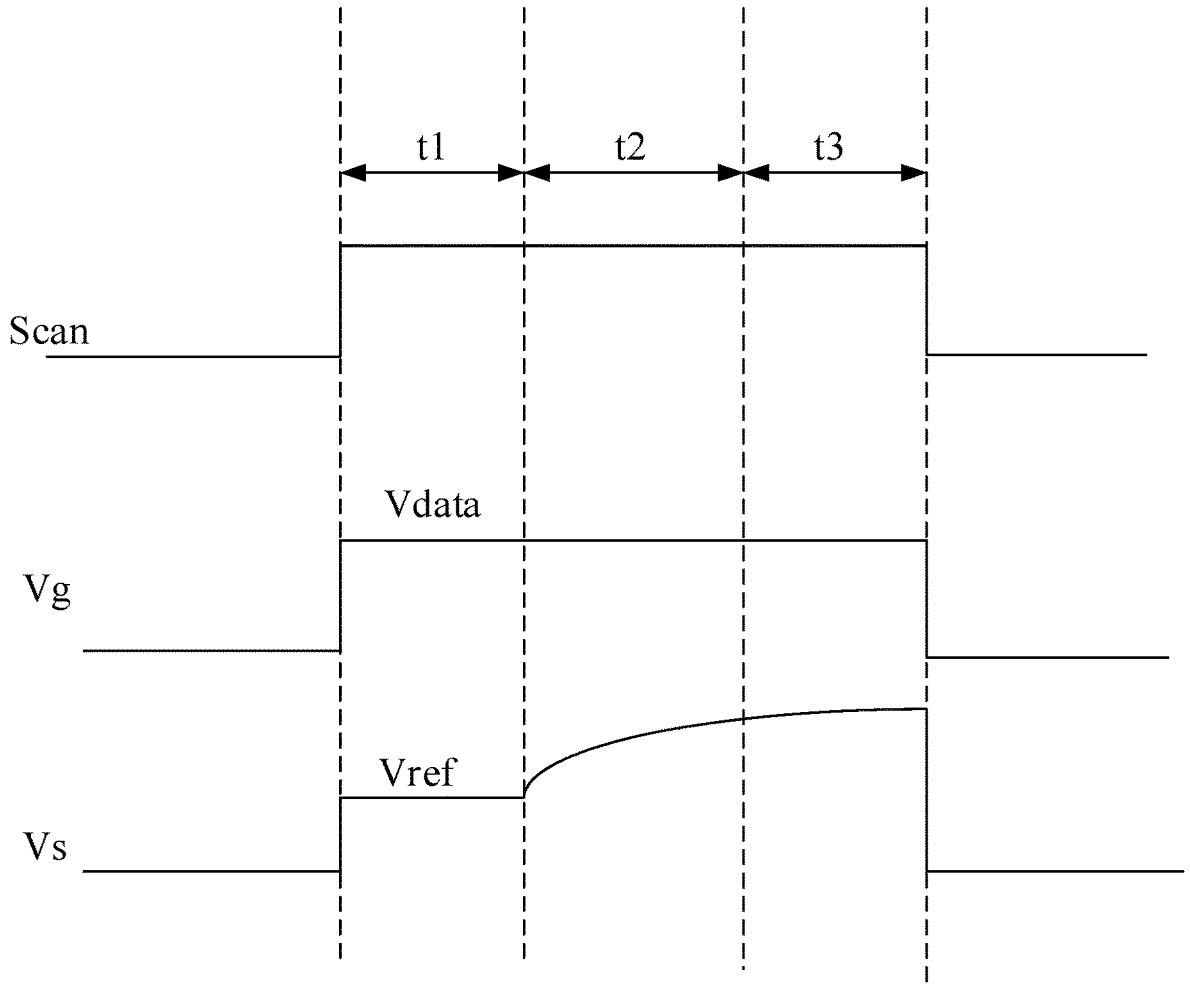
FIG. 5 is a timing diagram of a pixel driving circuit of changing a control voltage of a scanning line according to an embodiment of the present disclosure.

However, it should be noted that, when the switching transistor T2 and the sensing transistor T3 are controlled by the same scanning line Scan, if the control voltage of the scanning line Scan is not changed all the time (that is, as shown in FIG. 5, a same potential is used for the scanning line Scan in a pre-charging stage t1, a detection stage t2, and a sampling stage t3), with reference to FIG. 4 and FIG. 5, when the threshold voltage of the driving transistor T1 is detected, the switching transistor T2 and the sensing transistor T3 are turned on at the same time, so that the potential of the gate g of the driving transistor T1 is always the data voltage Vdata and the floating state cannot be maintained. In this way, when the driving transistor T1 is turned on and the potential of the source s of the driving transistor T1 is pulled up by the input terminal VDD of the power supply, the gate-source potential difference Vgs of the driving transistor T1 cannot remain to be stable. It may be known from a transfer characteristic curve (Vgs-Ids) of the transistor, that the source-drain current Ids flowing through the driving transistor T1 is also unstable, and therefore the light emitting brightness of the organic light emitting diode OLED is unstable. Then, it can be known according to following formula of a source-drain current in a saturated region of the driving transistor T1, $I=K(Vgs-Vth)^2$, that the gate-source potential difference Vgs across the driving transistor T1 is decreased with an increase of the potential of the source s, that is, the source-drain current Ids is decreased with an increase of the potential of the source s, where, K represents an intrinsic conduction factor of the driving transistor T1 and refers to a parameter that has a linear relationship with a mobility of the driving transistor T1. Since the drain is connected to the input terminal VDD of the power supply and its potential is a constant value, the potential of the source s is not linearly increased, that is, a detected voltage data and a mobility do not meet a linear relationship, so that detection of the mobility of the driving transistor T1 is inaccurate and an obtained mobility compensation coefficient is also inaccurate.

Figure 6:
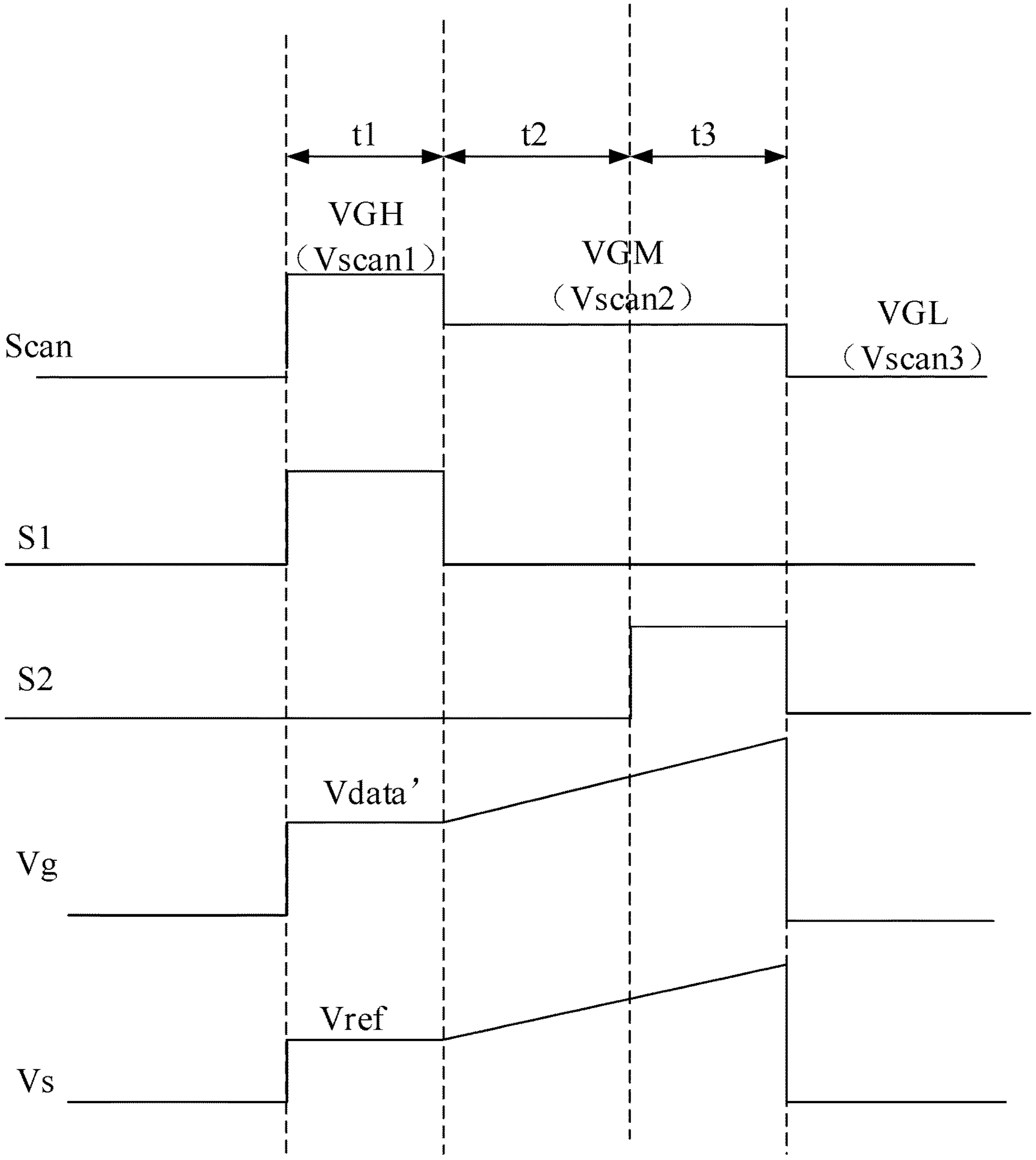
FIG. 6 is a timing diagram of a pixel driving circuit of changing a control voltage of a scanning line if a switching transistor is an N-type thin film transistor according to an embodiment of the present disclosure.
Figure 7:
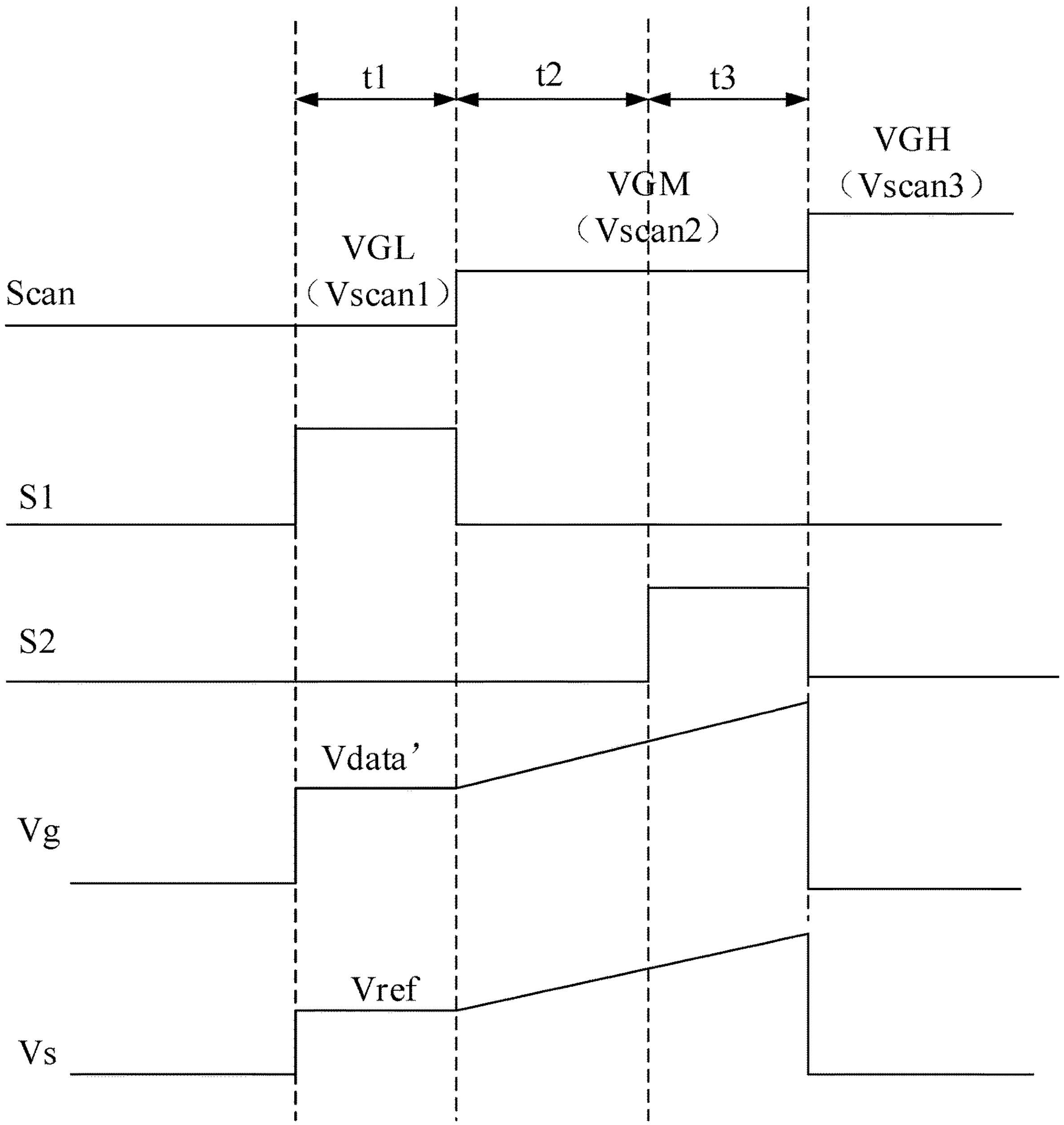
FIG. 7 is a timing diagram of a pixel driving circuit of changing a control voltage of a scanning line if a switching transistor is a P-type thin film transistor according to an embodiment of the present disclosure.

Therefore, according to the pixel driving circuit provided in the embodiment of the present disclosure, as shown in FIG. 4, FIG. 6, or FIG. 7, in the pre-charging stage t1, the reset switch S1 is closed, and the first scan voltage Vscan1 provided to the scanning line Scan, the data voltage Vdata provided to the data line Vdata, and the reset voltage Vref provided to the reset line Ref enable both the switching transistor T2 and the sensing transistor T3 to be turned on. In the detection stage t2 following the pre-charging stage t1, the reset switch S1 is turned off, and the second scanning voltage Vscan2 provided to the scanning line Scan enables the switching transistor T2 to be turned off and the sensing transistor T3 to be turned on, so that both the gate g and the source s of the driving transistor T1 are in the floating state.

Specifically, in the pre-charging stage t1, the gate-source voltage difference Vgs of the switching transistor T2 is Vscan1−Vdata', and the gate-source voltage difference Vgs of the sensing transistor T3 is Vscan1−Vref, which enable the switching transistor T2 and the sensing transistor T3 to be turned on, so that the potential of the gate of the driving transistor T1 is Vdata', the potential of the source thereof is Vref, and the gate-source potential difference Vgs of the driving transistor T1 is Vdata'−Vref, which enables the driving transistor T1 to be turned on. In the detection stage t2, when the threshold voltage of the driving transistor T1 is detected, the voltage of the scanning line Scan is adjusted, so that the first scanning voltage Vscan1 provided to the scan signal line Scan is changed to the second scan voltage Vscan2. As a result, the gate-source voltage difference Vgs of the switching transistor T2 is Vscan2−Vdata', which enables the switching transistor T2 to be turned off, so that the gate g of the driving transistor T1 is in the floating state. Meanwhile, the gate-source potential difference of the sensing transistor T3 is Vscan2−Vref, which enables the sensing transistor T3 to be turned on. In this case, the reset switch S1 is turned off, and the source s of the driving transistor T1 is also in the floating state. That is, in this case, both the gate g and the source of the driving transistor T1 remain in the floating state. Therefore, when the potential of the source s of the driving transistor T1 and the potential of the sensing line Sense are pulled up by the input terminal VDD of the power supply, the potential of the gate g of the driving transistor T1 is also increased under the coupling effect of the storage capacitor Cst, that is, the gate-source potential difference Vgs of the driving transistor T1 can remain unchanged.

According to the pixel driving circuit provided in the embodiment of the present disclosure, the switching transistor T2 and the sensing transistor T3 are controlled by the same scanning line Scan. In the pre-charging stage t1, the reset switch S1 is closed, and the first scanning voltage Vscan 1 provided to the scanning line Scan, the data voltage Vdata' provided to the data line Data, and the reset voltage Vref provided to the reset line Ref enable both the switching transistor T2 and the sensing transistor T3 to be turned on, so that the driving transistor T1 is turned on. In the detection stage t2, the reset switch S1 is opened to change the first scanning voltage Vscan1 provided to the scanning signal line Scan to the second scanning voltage Vscan2, so as to enable the sensing transistor T3 to be turned on and the switching transistor T2 to be turned off, so that both the gate g and the source s of the driving transistor are in the floating state. As a result, when the potential of the source s of the driving transistor T1 rises at the input terminal VDD of the power supply, the potential of the gate g of the driving transistor T1 rises due to a coupling effect of the storage capacitor Cst, and the gate-source potential difference Vgs of the driving transistor T1 remains to be stable, so that the source-drain current Ids flowing through the driving transistor T1 can also remain to be stable. In this way, the mobility of the driving transistor T1 can be accurately detected, thereby accurately compensating for the mobility of the driving transistor T1.

Further, please continue to refer to FIG. 4, the pixel driving circuit further includes a sampling switch S2 and a processing unit 100, where a first terminal of the sampling switch S2 is connected to the sensing line Sense, and a second terminal of the sampling switch S2 is connected to the processing unit 100. In the detection stage t2, the sampling switch S2 is turned off, and the processing unit 100 collects the threshold voltage Vth1 of the driving transistor T1 by using the sensing line Sense, and obtains the mobility of the driving transistor T1 according to the current flowing through the driving transistor T1.

Based on the foregoing embodiments, an embodiment of the present disclosure further provides a display panel, where the display panel includes an organic light emitting diode OLED and the pixel driving circuit as described above, an anode of the organic light emitting diode OLED is connected to a source of the driving transistor T1, and a cathode of the organic light emitting diode OLED is connected to a negative terminal VSS of the power supply. Since the display panel has the same structure and beneficial effects as the pixel driving circuit, and the pixel driving circuit has been described in detail in the foregoing embodiments, details thereof are not described repeatedly herein.

Based on the foregoing embodiment, an embodiment of the present disclosure further provides a method for driving a pixel driving circuit. As shown in FIG. 4, FIG. 6, or FIG. 7, the method includes:

in a pre-charging stage t1, closing the reset switch S1 so that a first scanning voltage Vscan1 provided to a scanning line, a data voltage Vdata' provided to a data line, and a reset voltage provided to a reset line enable both a switching transistor T2 and a sensing transistor T3 to be turned on; and in a detection stage following the pre-charging stage, opening the reset switch S1 so that a second scanning voltage Vscan2 provided to the scanning line Scan enables the switching transistor T2 to be turned off and the sensing transistor T3 to be turned on, and both the gate and the source of the driving transistor T1 being in a floating state.

In some embodiments, the driving method of the pixel driving circuit further include: in a sampling stage t3 following the detection stage t2, closing the sampling switch S2, maintaining the reset switch S1 to be opened, maintaining the switching transistor T2 to be turned off, maintaining both the driving transistor T1 and the sensing transistor T3 to be turned on, obtaining a threshold voltage Vth1 of the driving transistor T1 by a sensing line Sense, and obtaining a mobility of the driving transistor T1 according to a current flowing through the driving transistor T1.

In some embodiments, the driving method of the pixel driving method further includes: in the pre-charging stage t1, superimposing the threshold voltage Vth1 of the driving transistor T1 obtained in the sampling stage t3 onto a data voltage Vdata provided to the data line Data to obtain a new data voltage Vdata', and then inputting the new data voltage Vdata' into the gate g of the driving transistor.

Specifically, after the threshold voltage Vth1 of the driving transistor T1 obtained in the sampling stage t3 is superimposed onto the data voltage Vdata provided to the data line Data, the resulting new data voltage Vdata' is input to the gate of the driving transistor T1, that is, Vdata'=Vdata+Vth, to compensate for the threshold voltage of the driving transistor T1, so that the current flowing through the driving transistor T1 is independent of the threshold voltage of the driving transistor T1 but only related to the mobility. Therefore, a mobility difference may be determined, so as to compensate for the mobility difference. Meanwhile, the reset switch S1 is closed, so as to input the reset voltage Vref provided to the reset line Ref to the source s of the driving transistor T1, so that the potential of the first terminal g of the storage capacitor Cst is the data voltage Vdata', and the potential of the second terminal s thereof is the reset voltage Vref, thereby completing charging of the storage capacitor Cst.

It should be noted that, in the pre-charging stage t1, the input terminal VDD of the power supply is at a low level, so as to prevent the organic light emitting diode OLED from emitting light. In detection stage t2 and sampling stage t3, the input terminal VDD of the power supply is at a high level, so as to cause the driving transistor T1 to drive the organic light emitting diode OLED to emit light.

It should be further noted that, after the pre-charging stage t1, the detection stage t2, and the sampling stage t3, the second scanning voltage Vscan2 provided to the scanning line Scan is changed to the third scanning voltage Vscan3, so that both the switching transistor T2 and the sensing transistor T3 are turned off.

In some embodiments, as shown in FIG. 6, if the switching transistor T2 is an N-type thin film transistor, the second scanning voltage Vscan2 provided to the scanning line Scan in the detection stage t2 is less than the first scanning voltage Vscan1 provided in the pre-charging stage t1.

That is, when the switching transistor T2 is an N-type thin film transistor, and the sensing transistor T3 is an N-type thin film transistor or a P-type thin film transistor, a high potential VGH of the first scanning voltage Vscan1 provided in the pre-charging stage t1 by the scanning line Scan is decreased to an intermediate potential VGM of the second scanning voltage Vscan2 provided in the detection stage t2, so that the gate-source potential difference Vgs of the switching transistor T2 is less than a threshold voltage Vth2 of the switching transistor T2, which enables the switching transistor T2 to be turned off. However, when the sensing transistor T3 is an N-type thin film transistor, it needs to be ensured that the gate-source potential difference Vgs of the sensing transistor T3 is greater than the threshold voltage Vth3 of the sensing transistor T3, so that the sensing transistor T3 is turned on. When the sensing transistor T3 is a P-type thin film transistor, the gate-source potential difference Vgs of the sensing transistor T3 may be decreased as the scanning voltage Vscan provided to the scanning line Scan is decreased, so that the sensing transistor T3 may be turned on more thoroughly.

In some embodiments, as shown in FIG. 7, if the switching transistor T2 is a P-type thin film transistor, the second scanning voltage Vscan2 provided to the scanning line Scan in the detection stage t2 is greater than the first scanning voltage Vscan1 provided in the pre-charging stage t1.

That is, when the switching transistor T2 is a P-type thin film transistor, and the sensing transistor T3 is an N-type thin film transistor or a P-type thin film transistor, a low potential VGL of the first scanning voltage Vscan1 provided in the pre-charging stage t1 by the scanning line Scan is increased to an intermediate potential VGM of the second scanning voltage Vscan2 provided in the detection stage t2, so that the gate-source potential difference Vgs of the switching transistor T2 is greater than a threshold voltage Vth2 of the switching transistor T2, which enables the switching transistor T2 to be turned off. Further, when the sensing transistor T3 is an N-type thin film transistor, the gate-source potential difference Vgs of the sensing transistor T3 may be increased as the scanning voltage Vscan provided to the scanning line Scan is increased, so that the sensing transistor T3 may be turned on more thoroughly. When the sensing transistor T3 is a P-type thin film transistor, it needs to be ensured that the gate-source potential difference Vgs of the sensing transistor T3 is less than the threshold voltage Vth3 of the sensing transistor T3, so that the sensing transistor T3 is turned on.

It should be noted that the potentials of the first scan voltage Vscan1 and the second scan voltage Vscan2 provided to the scanning line Scan in the foregoing embodiment refer to actual potentials. For example, the potential is adjusted from −8V to −12 V so as to decrease the potential, and the potential is adjusted from −15 V to −7V so as to increase the potential. VGH in FIG. 6 and FIG. 7 refers to a high potential of the scanning line Scan, VGM refers to an intermediate potential of the scanning line Scan adjusted in the detection stage, and VGL refers to a low potential of the scanning line Scan. The reset switch S1 and the sampling switch S2 are closed in response to the scanning line being at a high potential and opened in response to the scanning line being at a low potential.

Based on the foregoing embodiment, an example that the driving transistor T1, the switching transistor T2, and the sensing transistor T3 in the pixel driving circuit are all N-type thin film transistors is taken. With reference to FIG. 4 and FIG. 6, a working process of the driving method of the pixel driving circuit is described in detail as follows:

In the pre-charging t1, the first scanning voltage Vscan1 of the high potential VGH (for example, 28V) provided to the scanning line Scan enables the switching transistor T2 and the sensing transistor T3 to be turned on, so that the threshold voltage Vth1 of the driving transistor T1 detected in real time is superposed onto the data voltage Vdata provided to the data line Data to obtain the compensated data voltage Vdata'=Vdata+Vth and input Vdata' to the gate of the driving transistor T1. As a result, the potential of the gate of the driving transistor T1 is Vdata+Vth. According to following current formula of a current flowing through the driving transistor T1, $I=K(Vgs-Vth)^2$, where K represents an intrinsic conduction factor of the driving transistor T1, and Vgs represents a gate-source voltage difference of the driving transistor T1, the current flowing through the driving transistor T1 is $I=K(Vgs-Vth)^2=(Vdata+Vth-VDD-Vth)^2=(Vdata\sim VDD)^2$. That is, the current I flowing through the driving transistor T1 is independent of a threshold voltage Vth1 of the driving transistor T1, thereby compensating for a threshold voltage of the driving transistor T1 before the detection. That is, the compensation of the threshold voltage of the driving transistor T1 is completed before detecting the realtime threshold voltage of the driving transistor T1. In addition, the reset switch S1 is closed, so as to input the reset voltage Vref provided to the reset line Ref to the source s of the driving transistor T1, so that the potential of the first terminal g of the storage capacitor Cst is the data voltage Vdata', and the potential of the second terminal s thereof is the reset voltage Vref, thereby completing charging of the storage capacitor Cst.

It should be noted that in this case, the data voltage Vdata' provided to the data line Data should be relatively large (for example, 10V), and the reset voltage Vref provided to the reset line Ref should be relatively small (for example, 1V). In this way, it is better that the switching transistor T2 is turned off and the sensing transistor is turned on under the control of the second scan voltage Vscan2 provided to the voltage modulated scanning line Scan in the detection stage t2.

In the detection stage t2, the high potential VGH (for example, 28V) of the first scanning voltage Vscan1 provided to the scanning line Scan is decreased to the intermediate potential VGM (for example, 6V) of the second scanning voltage Vscan2. In this case, if both the source potential and the drain potential of the switching transistor T2 are Vdata', for example, 10V, the gate-source potential difference Vgs of the switching transistor T2 is −4V. Meanwhile, if both the source potential and the drain potential of the sensing transistor T3 are Vref, for example, 1V, the gate-source potential difference Vgs of the sensing transistor T3 is 5V. Therefore, the switching transistor T2 is turned off and the sensing transistor T3 is turned on, so that the gate of the driving transistor T1 is in the floating state. In addition, the reset switch S1 is opened, so that the source of the driving transistor T1 is also in the floating state. In this case, the source potential Vs of the driving transistor T1 is increased together with the increase of the gate potential Vg due to a coupling effect of the storage capacitor Cst, and the gate-source potential difference Vgs of the driving transistor T1 remains to be stable, which results in better turn-off of the driving transistor T1.

It should be noted that, in the pre-charging stage t1 and the detection stage t2, the source potential Vs of the driving transistor T1 needs to be kept less than Voled, which is a lighting voltage of the organic light emitting diode OLED, so as to prevent the organic light emitting diode OLED from emitting light in a non-light emitting stage.

In the sampling stage t3, the scanning line Scan remains at an intermediate potential VGM (for example, 6V) of the second scanning voltage Vscan2. The sampling switch S3 is turned off, a threshold voltage of the driving transistor T1 is obtained by using the sensing line Sense, and according to the current flowing through the driving transistor T1, the processing unit 100 (including an analog-to-digital converter ADC) is connected to the source of the sampling switch S3 for data processing and voltage acquisition to obtain the voltage data, so as to obtain the mobility of the driving transistor T1, and further determine the mobility compensation coefficient of the driving transistor T1 to accurately compensate for the mobility error of the driving transistor T1.

After the pre-charging stage t1, the detection stage t2, and the sampling stage t3, the intermediate potential VGM (for example, 6V) of the second scanning voltage Vscan2 provided to the scanning line Scan is changed to the low potential VGL (for example, −6V) of the third scanning voltage Vscan3, so that both the switching transistor T2 and the sensing transistor T3 are turned off.

According to the driving method of the pixel driving circuit provided in the embodiment of the present disclosure, the switching transistor T2 and the sensing transistor T3 are controlled by the same scanning line Scan. In the pre-charging stage t1, the reset switch S1 is closed, and the first scanning voltage Vscan 1 provided to the scanning line Scan, the data voltage Vdata' provided to the data line Data, and the reset voltage Vref provided to the reset line Ref enable both the switching transistor T2 and the sensing transistor T3 to be turned on, so that the driving transistor T1 is turned on. In the detection stage t2, the reset switch S1 is opened to change the first scanning voltage Vscan1 provided to the scanning signal line Scan to the second scanning voltage Vscan2, so as to enable the sensing transistor T3 to be turned on and the switching transistor T2 to be turned off, so that both the gate g and the source s of the driving transistor are in the floating state. As a result, when the potential of the source s of the driving transistor T1 rises at the input terminal VDD of the power supply, the potential of the gate g of the driving transistor T1 rises due to a coupling effect of the storage capacitor, and the gate-source potential difference Vgs of the driving transistor T1 remains to be stable, so that the source-drain current Ids flowing through the driving transistor T1 can also remain to be stable. In this way, the mobility of the driving transistor T1 can be accurately detected, and therefore the mobility of the driving transistor T1 can be compensated accurately.

It can be understood that, for those ordinary skilled in the art, equivalent replacements or changes can be made according to the technical solutions and inventive concepts of the present disclosure, and all such changes or replacements should fall within the protection scope of the claims appended to the present disclosure.

What is claimed is:

1. A pixel driving circuit, comprising a scanning line, a data line, a sensing line, a reset line, a driving transistor, a switching transistor, a sensing transistor, a storage capacitor, and a reset switch, wherein a gate of the driving transistor is respectively connected to a drain of the switching transistor and a first terminal of the storage capacitor, a drain of the driving transistor is connected to an input terminal of a power supply, a source of the driving transistor is respectively connected to a drain of the sensing transistor and a second terminal of the storage capacitor, both a gate of the switching transistor and a gate of the sensing transistor are connected to the scanning line, a source of the switching transistor is connected to the data line, a source of the sensing transistor is connected to the sensing line, a first terminal of the reset switch is connected to the source of the sensing transistor, and a second terminal of the reset switch is connected to the reset line;

in a pre-charging stage, the reset switch is closed, and a first scanning voltage provided to the scanning line, a data voltage provided to the data line, and a reset voltage provided to the reset line enable both the switching transistor and the sensing transistor to be turned on; and in a detection stage following the pre-charging stage, the reset switch is opened, a second scanning voltage provided to the scanning line enables the switching transistor to be turned off and the sensing transistor to be turned on, so that both the gate of the driving transistor and the source of the driving transistor are in a floating state.

2. The pixel driving circuit of claim 1, further comprising a sampling switch and a processor, wherein a first terminal of the sampling switch is connected to the sensing line, and a second terminal of the sampling switch is connected to the processor.

3. The pixel driving circuit of claim 2, wherein, in the detection stage, the driving transistor is turned on and the sampling switch is turned off.

4. The pixel driving circuit of claim 2, wherein, in a sampling stage following the detection stage, the sampling switch is closed, the reset switch is opened, the switching transistor remains to be turned off, and both the driving transistor and the sensing transistor remains to be turned on.

5. The pixel driving circuit of claim 1, wherein, in the case that the switching transistor is an N-type thin film transistor, the second scanning voltage is less than the first scanning voltage.

6. The pixel driving circuit of claim 1, wherein, in the case that the switching transistor is a P-type thin film transistor, the second scanning voltage is greater than the first scanning voltage.

* * * * *